US010207637B2

(12) United States Patent
Ortega Garcia et al.

(10) Patent No.: US 10,207,637 B2
(45) Date of Patent: Feb. 19, 2019

(54) DOME LIGHT ASSEMBLY FOR A MOTOR VEHICLE

(71) Applicant: FORD GLOBAL TECHNOLOGIES, LLC, Dearborn, MI (US)

(72) Inventors: Edgar Javier Ortega Garcia, Tlalnepantla (MX); Fabrizio Dublan Sanchez, Cuautitlan Izcalli (MX); Carlos Ernesto Saenz Camacho, Calimaya (MX)

(73) Assignee: Ford Global Technologies, LLC, Dearborn, MI (US)

(*) Notice: Subject to any disclaimer, the term of this patent is extended or adjusted under 35 U.S.C. 154(b) by 271 days.

(21) Appl. No.: 15/131,505

(22) Filed: Apr. 18, 2016

(65) Prior Publication Data

US 2017/0299154 A1 Oct. 19, 2017

(51) Int. Cl.

| | |
|---|---|
| ***B60Q 3/74*** | (2017.01) |
| ***B60Q 3/51*** | (2017.01) |
| ***F21V 17/10*** | (2006.01) |
| ***F21V 17/14*** | (2006.01) |
| ***F21V 17/18*** | (2006.01) |

(52) U.S. Cl.

CPC ................ *B60Q 3/74* (2017.02); *B60Q 3/51* (2017.02); *F21V 17/101* (2013.01); *F21V 17/14* (2013.01); *F21V 17/18* (2013.01)

(58) Field of Classification Search

CPC .. B60Q 3/51; B60Q 3/74; F21V 17/14; F21V 17/18; F21V 17/101

See application file for complete search history.

(56) References Cited

U.S. PATENT DOCUMENTS

| | | | | |
|---|---|---|---|---|
| 3,781,790 A | 12/1973 | Dawson | | |
| 4,625,265 A | 11/1986 | Bushong | | |
| 5,097,397 A | 3/1992 | Stanuch et al. | | |
| 6,140,918 A | 10/2000 | Green et al. | | |
| 7,563,007 B2 * | 7/2009 | Reeves | B60R 19/18 | 362/368 |
| 7,607,807 B2 * | 10/2009 | Hall | B60Q 3/51 | 296/215 |
| 2005/0174791 A1 * | 8/2005 | Bynum | B60Q 3/82 | 362/490 |
| 2010/0230566 A1 | 9/2010 | Neufeglise | | |
| 2011/0128749 A1 * | 6/2011 | Ludwig | B60Q 3/51 | 362/490 |

* cited by examiner

*Primary Examiner* — Stephen F Husar

(74) *Attorney, Agent, or Firm* — Vichit Chea; King & Schickli, PLLC

(57) ABSTRACT

A dome light assembly is provided for mounting to a headliner in a motor vehicle. That dome light assembly includes a mounting bracket having a flange engaging an upper face of the headliner and a receiver. Further, the dome light assembly includes a lamp housing including a fastener secured to the receiver and a light source held in the lamp housing. A related method is also provided.

14 Claims, 11 Drawing Sheets

DOME LIGHT ASSEMBLY FOR A MOTOR VEHICLE

TECHNICAL FIELD

This document relates generally to the motor vehicle equipment field and, more particularly, to a new and improved dome light assembly for mounting to a headliner in a motor vehicle as well as to a related method.

BACKGROUND

It has long been known to provide a dome light in the headliner of a motor vehicle. This document relates to a new and improved dome light assembly that is inexpensive to produce and easy to assemble. Further, the dome light assembly is lightweight so as to virtually eliminate any potential for causing the headliner to sag over time.

SUMMARY

In accordance with the purposes and benefits described herein, a new and improved dome light assembly is provided for mounting to a headliner in a motor vehicle. That dome light assembly comprises a mounting bracket including a flange and a receiver. The flange engages an upper face of the headliner. Further, the dome light assembly includes a lamp housing including a fastener secured to the receiver. Still further, the dome light assembly includes a light source held in the lamp housing.

The receiver may include an aperture in the mounting bracket. That aperture may be irregular in shape and include an insert portion and a locking portion. That insert portion may be oriented along a first axis while the locking portion is oriented along a second axis which is oriented at an angle to the first axis.

The fastener provided on the lamp housing may be a T-shaped lug projecting from the lamp housing. Further, the receiver may include a margin of the mounting bracket outlining the insert portion and the locking portion of the aperture.

A first stop may be provided on the margin adjacent the insert portion of the aperture. A second stop may be provided on the margin adjacent the locking portion of the aperture. Further, a locking tab may be included on the margin between the first stop and the second stop adjacent the locking portion of the aperture.

Still further, a mounting slot may be provided between the T-shaped lug and the lamp housing. That lamp housing is displaceable between an installation position wherein the T-shaped lug is received in the insert portion of the aperture and a locked position wherein the T-shaped lug is rotated into the locking portion of the aperture with the margin of the mounting bracket received or received and captured in the mounting slot. Further, when in the locked position, the T-shaped lug may be captured between the locking tab and the second stop so that the mounting bracket and lamp housing are held together with the headliner captured there between.

Still further, in one possible embodiment the flange on the mounting bracket extends in a first plane while the receiver on the mounting bracket extends in a second plane. That first plane is parallel to and above the second plane when the dome light assembly is fully assembled and mounted in a mounting opening in a headliner of the motor vehicle.

In accordance with another aspect, a method is provided of mounting a dome light assembly to a headliner of a motor vehicle. That method may be described as comprising the steps of: (a) inserting a mounting bracket through a mounting opening of the headliner, (b) inserting a fastener on a lamp housing into a receiver on the mounting bracket and (c) rotating the lamp housing with respect to the mounting bracket to lock the lamp housing to the mounting bracket.

Still further, the method may include the step of engaging an upper surface of the headliner with a flange on the mounting bracket. In addition, the method may include the step of inserting a T-shaped lug on the lamp housing into an insert portion of an aperture in the mounting bracket. This may be followed by the step of rotating the lamp housing until the T-shaped lug is received and held in a locking portion of the aperture.

Still further, the method may include the step of capturing a margin of the mounting bracket around the aperture in a mounting slot provided between the T-shaped lug and the top of the lamp housing. In addition, the method may include the step of capturing the T-shaped lug in the locking portion of the aperture between a stop and a locking tab.

In the following description, there are shown and described several preferred embodiments of the dome light assembly as well as the related method of mounting a dome light assembly to a headliner of a motor vehicle. As it should be realized, the dome light assembly and related method are capable of other, different embodiments and their several details are capable of modification in various, obvious aspects all without departing from the dome light assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the dome light assembly and together with the description serve to explain certain principles thereof. In the drawing figures.

FIG. **3*a*** is a bottom plan view of the mounting bracket.

FIG. **3*b*** is a top plan view of the mounting bracket.

FIG. **4*a*** is a top plan view of the lamp housing showing the fastener that secures the lamp housing to the mounting bracket.

FIG. **4*b*** is a bottom plan view of the lamp housing showing the lens and the light source in phantom behind the lens.

FIG. **4*c*** is a partially cross-sectional view showing the mounting slot provided between the fastener and the top wall of the lamp housing.

Figure 5:
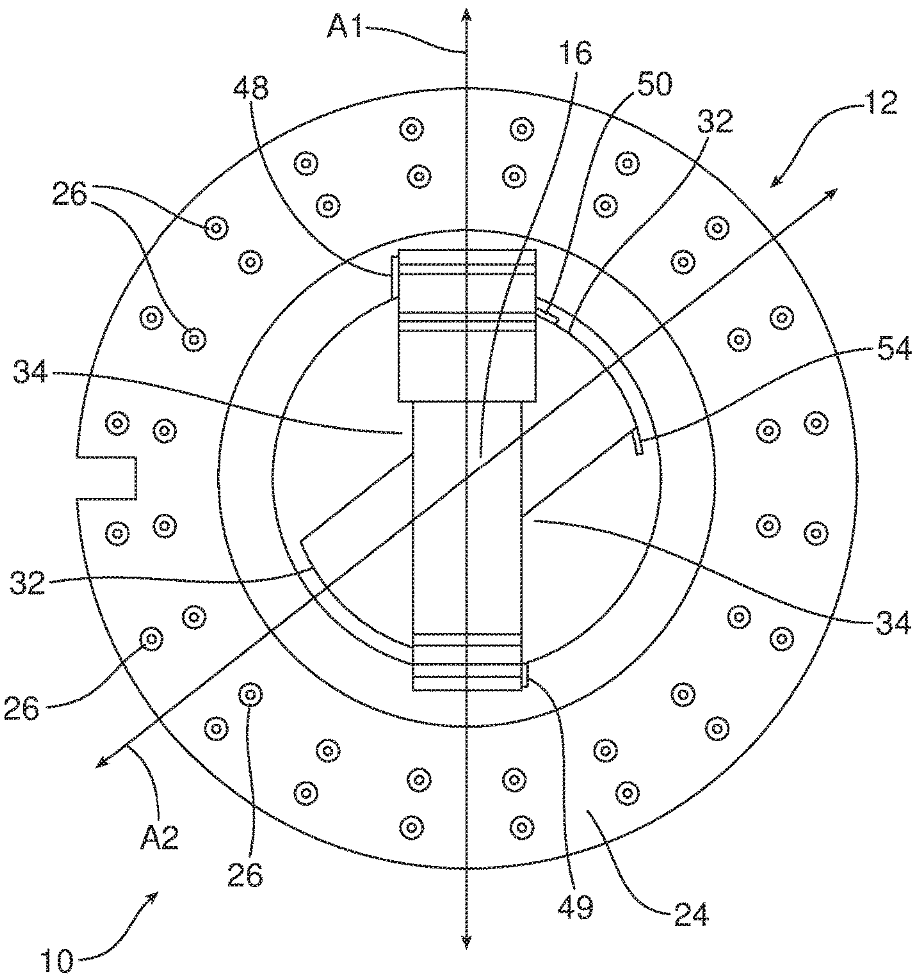

FIG. 5 is a top plan view illustrating the inserting of the fastener on the lamp housing into the insert portion of the receiver.

FIG. **5*a*** is a detailed perspective view illustrating the stops on the mounting bracket that prevent the lamp housing from being rotated in the wrong direction to secure the lamp housing to the mounting bracket.

Figure 6:
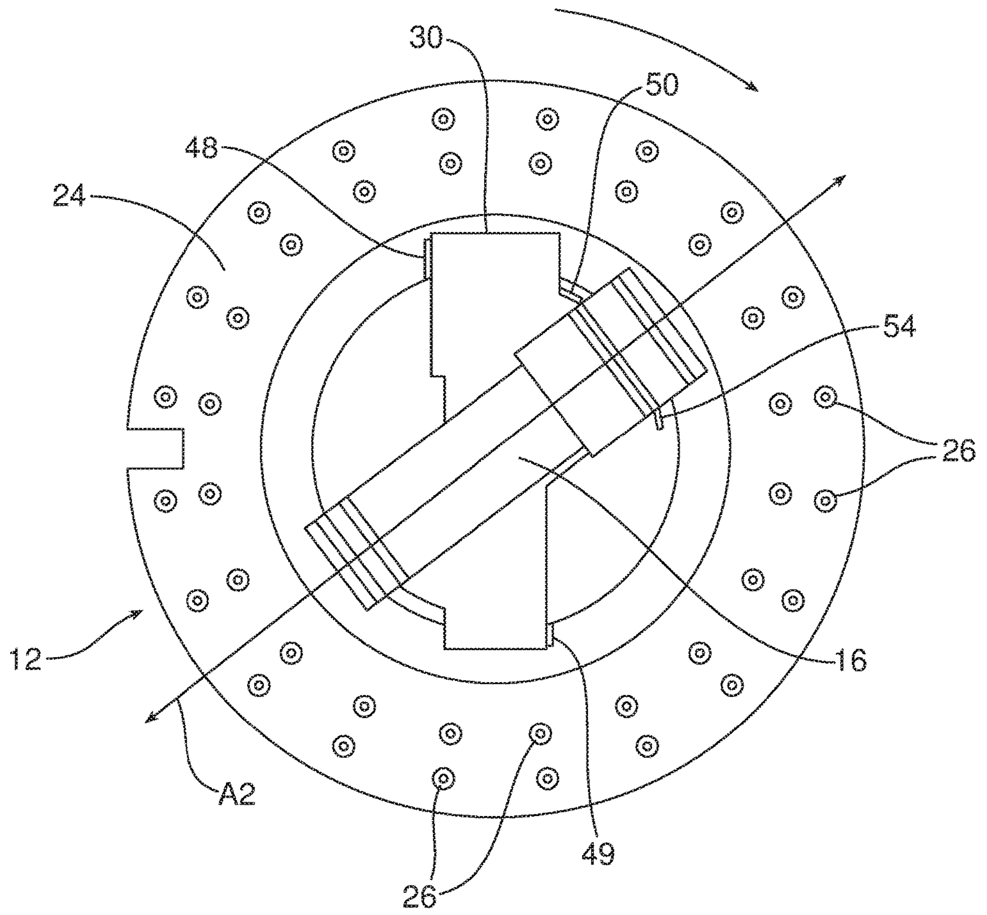

FIG. 6 is a top plan view illustrating the dome light assembly after the lamp housing has been rotated with respect to the mounting bracket to lock the lamp housing to the mounting bracket.

Figure 6A:
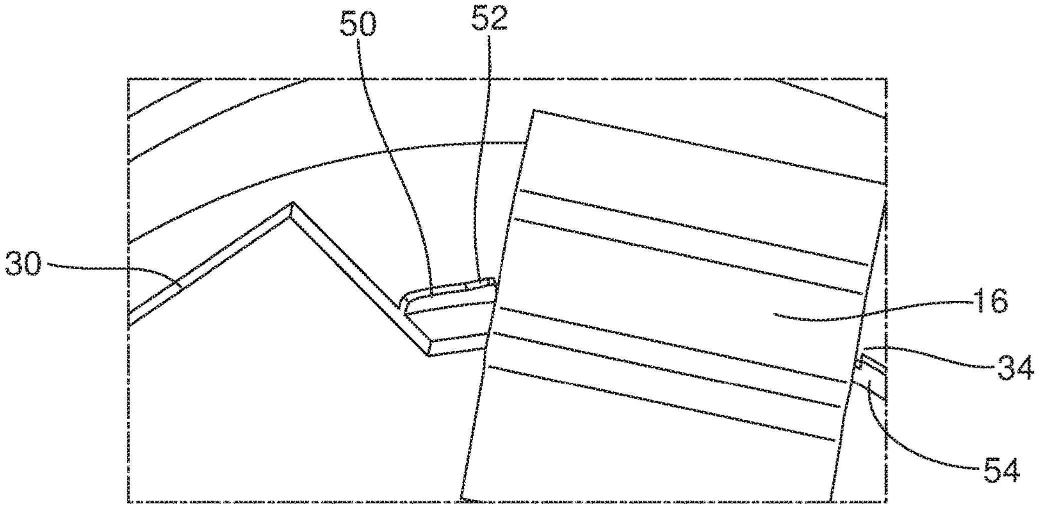

FIG. 6*a* is a detailed view illustrating how the fastener is captured and locked in the locked position by means of a locking tab and another stop carried on the mounting bracket.

Reference will now be made in detail to the present preferred embodiments of the dome light assembly, examples of which are illustrated in the accompanying drawing figures.

DETAILED DESCRIPTION

Figure 1:
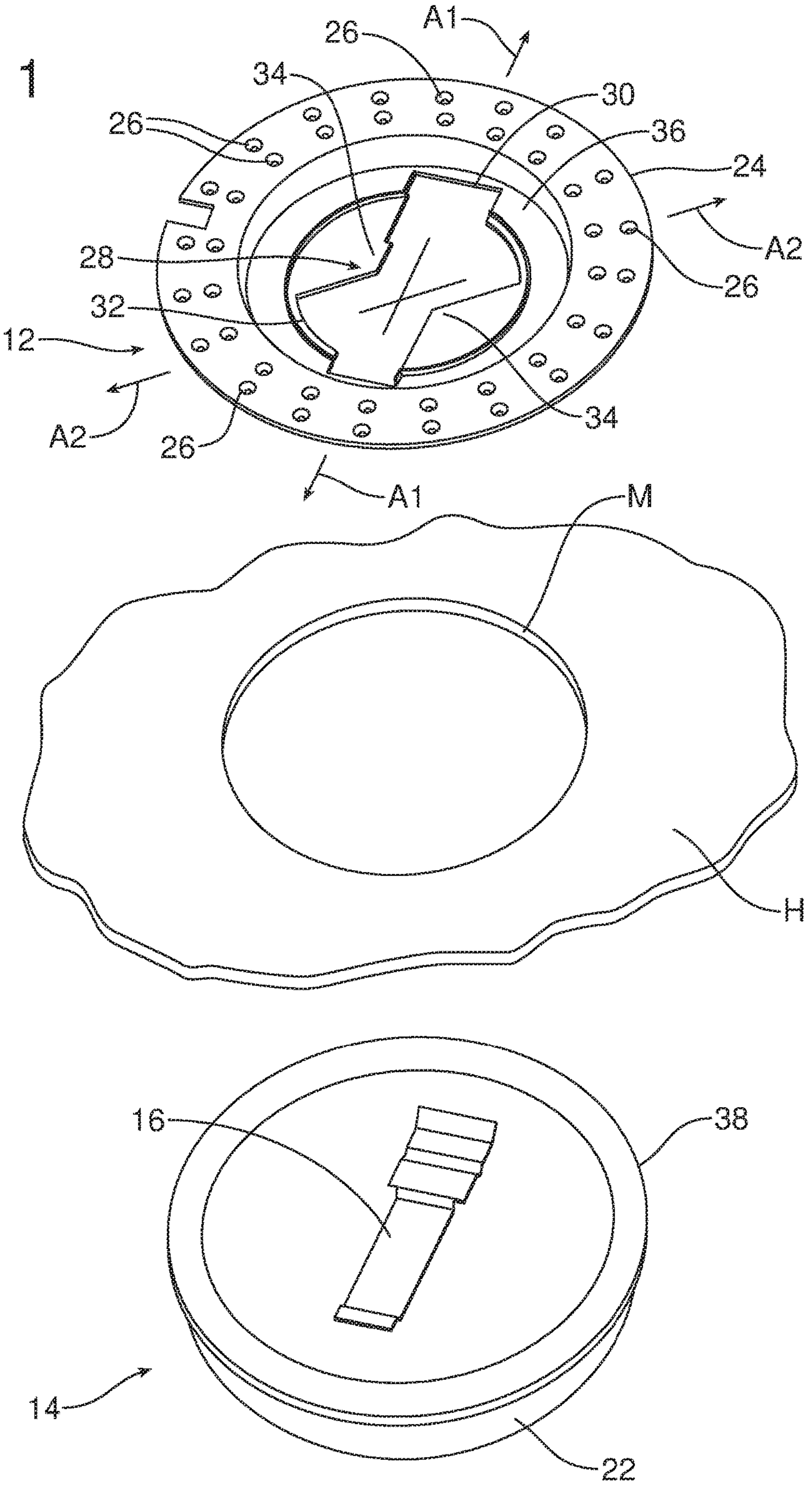
FIG. 1 is a partially exploded perspective view of the dome light assembly showing the mounting bracket above and the lamp housing below the headliner to which the dome light assembly is mounted.
Figure 2:
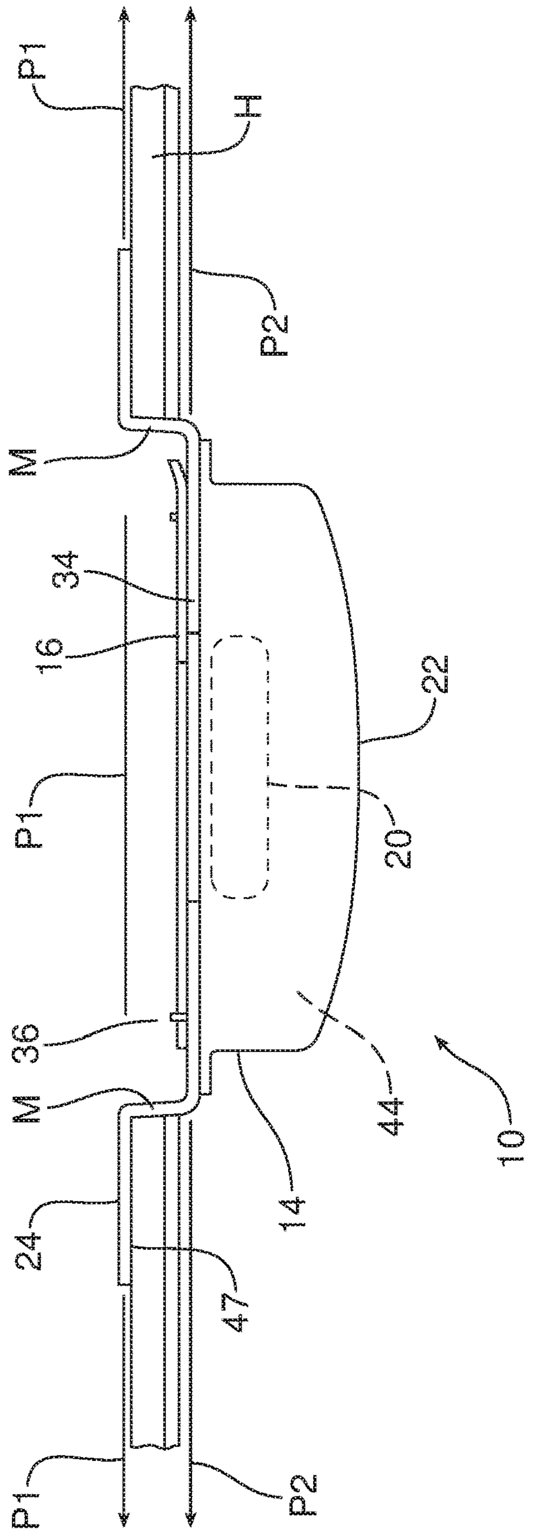
FIG. 2 is a schematic side elevational view showing the dome light assembly of FIG. 1 in the assembled condition wherein it is securely held in the mounting opening provided in the headliner.

Reference is now made to FIGS. 1 and 2 which illustrate the dome light assembly 10 that is mounted to a headliner H in a motor vehicle (not shown). As illustrated, the dome light assembly 10 includes a mounting bracket 12 which is inserted through a mounting opening M of the headliner H and a lamp housing 14 which includes a fastener 16 which is secured to the mounting bracket. A light source 20 is held in the lamp housing 14 behind a lens 22. That light source 20 may comprise substantially any light source of a type known in the art including, but not necessarily limited to, an incandescent bulb or a light-emitting diode.

Figure 3A:
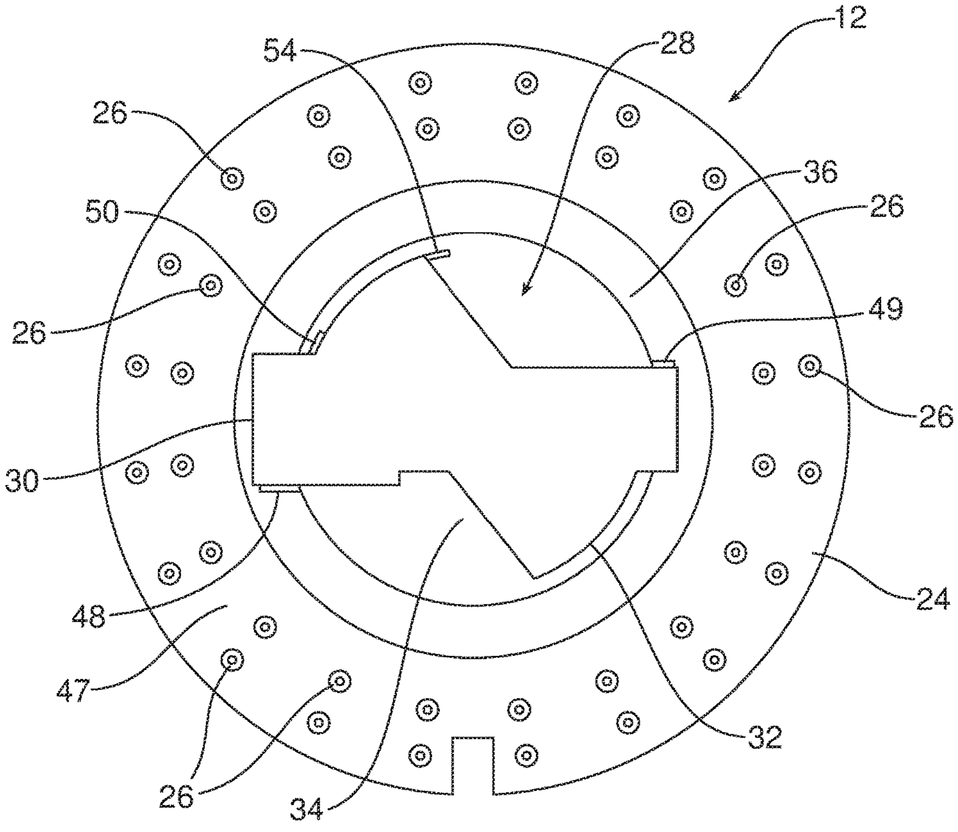
Figure 3B:
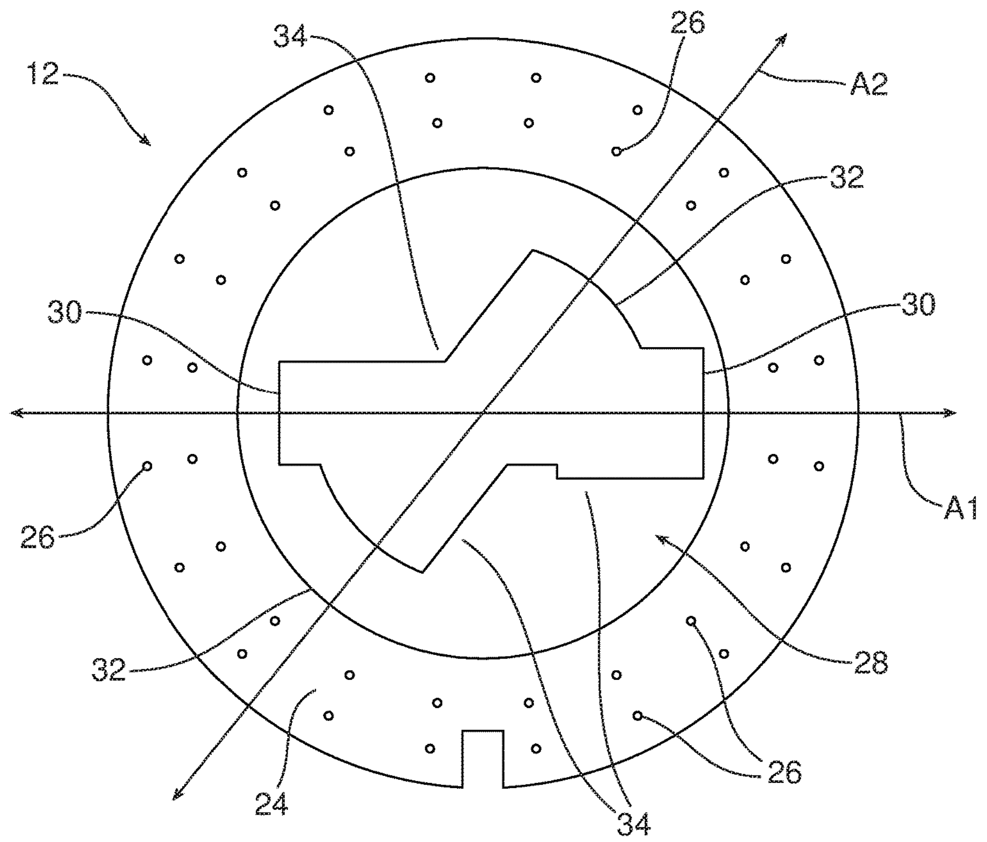

As best illustrated in FIGS. 3*a* and 3*b*, the mounting bracket 12 includes a flange 24 incorporating a plurality of glue holes 26. Further, the mounting bracket 12 includes a receiver, generally designated by reference numeral 28. In the illustrated embodiment, the receiver 28 comprises an aperture having an insert portion 30 and a locking portion 32. The receiver 28 further includes the margin 34 which extends around and defines the entire irregularly-shaped aperture including the insert portion 30 and the locking portion 32.

As should be appreciated from viewing drawing FIGS. 1 and 2, the flange 24 extends in a first plane P1 while the receiver 28 extends in a second plane P2. The first plane P1 is parallel to and above the second plane P2 when the dome light assembly 10 is fully assembled and mounted in the mounting opening M of the headliner H as illustrated in FIG. 2. Thus, the mounting bracket 12 includes a central cavity 36, the purpose of which will be identified below. As further illustrated in FIGS. 3*a* and 3*b*, the insert portion 30 is oriented along a first axis A1 while the locking portion 32 is oriented along a second axis A2 with that second axis oriented at an angle to the first axis. See FIGS. 1 and 3*b*.

Figure 4A:
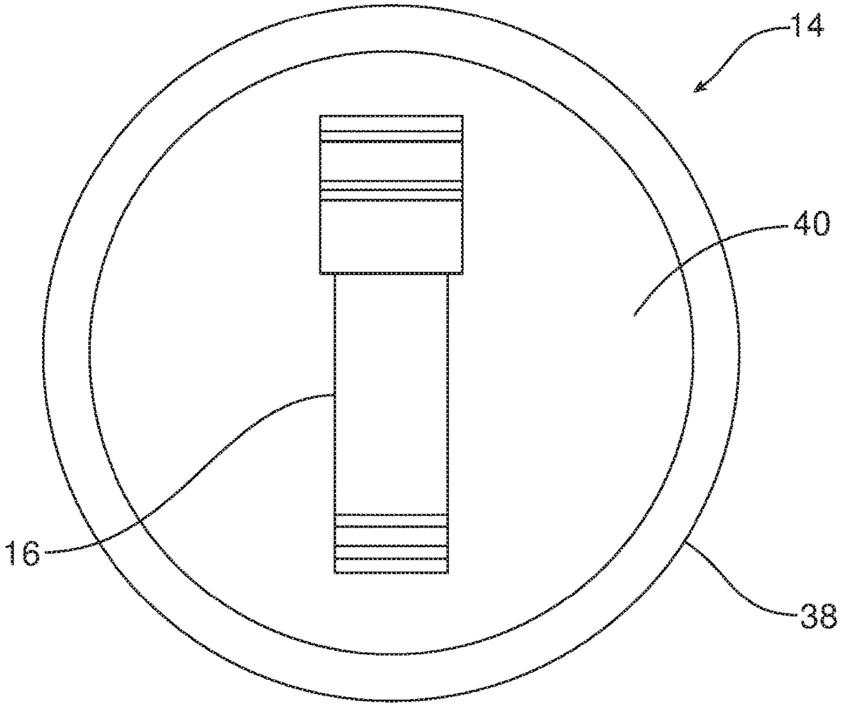
Figure 4B:
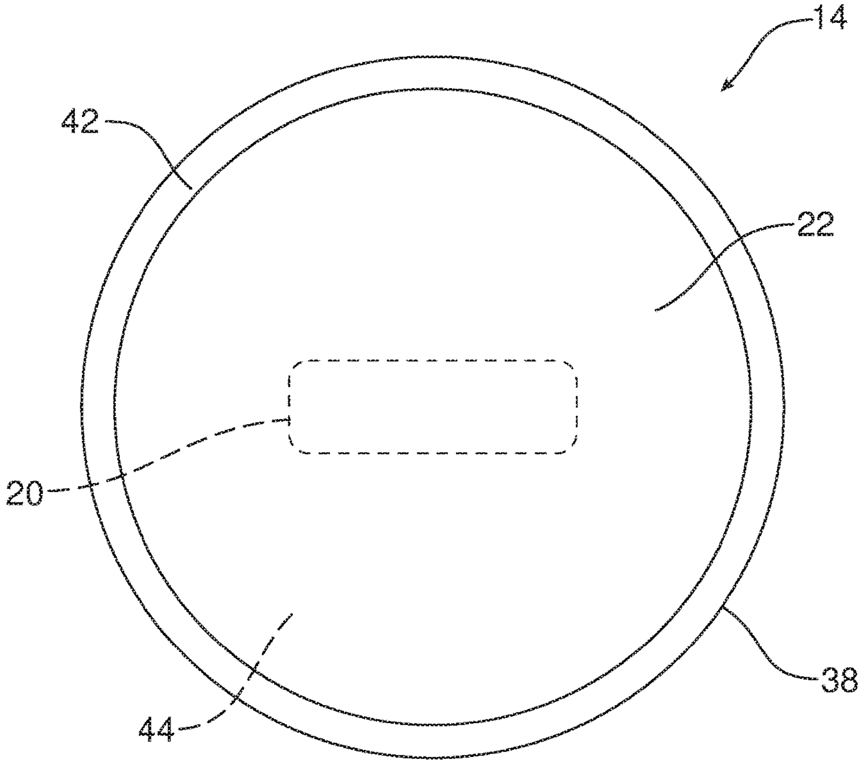

As best illustrated in FIGS. 4*a* and 4*b*, the lamp housing 14 includes a housing body 38 including an upper wall 40 and a continuous rim 42 which receives and holds the lens 22. The compartment 44 between the upper wall 40, the rim 42 and the lens 22 holds the light source 20. An access opening (not shown) in the upper wall may be provided to change the light source 20 in the event that becomes necessary.

Figure 4C:
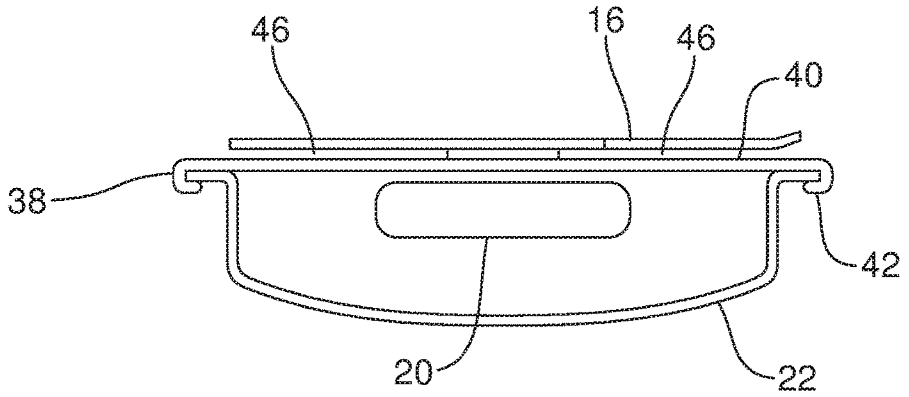

As further illustrated in FIGS. 4*a* and 4*c*, the fastener 16 carried on the upper wall 40 of the lamp housing 14 comprises a T-shaped lug in the illustrated embodiment. As should be appreciated, a mounting slot 46 is provided between the fastener/T-shaped lug and the upper wall 40 of the housing body 38.

Figure 5A:
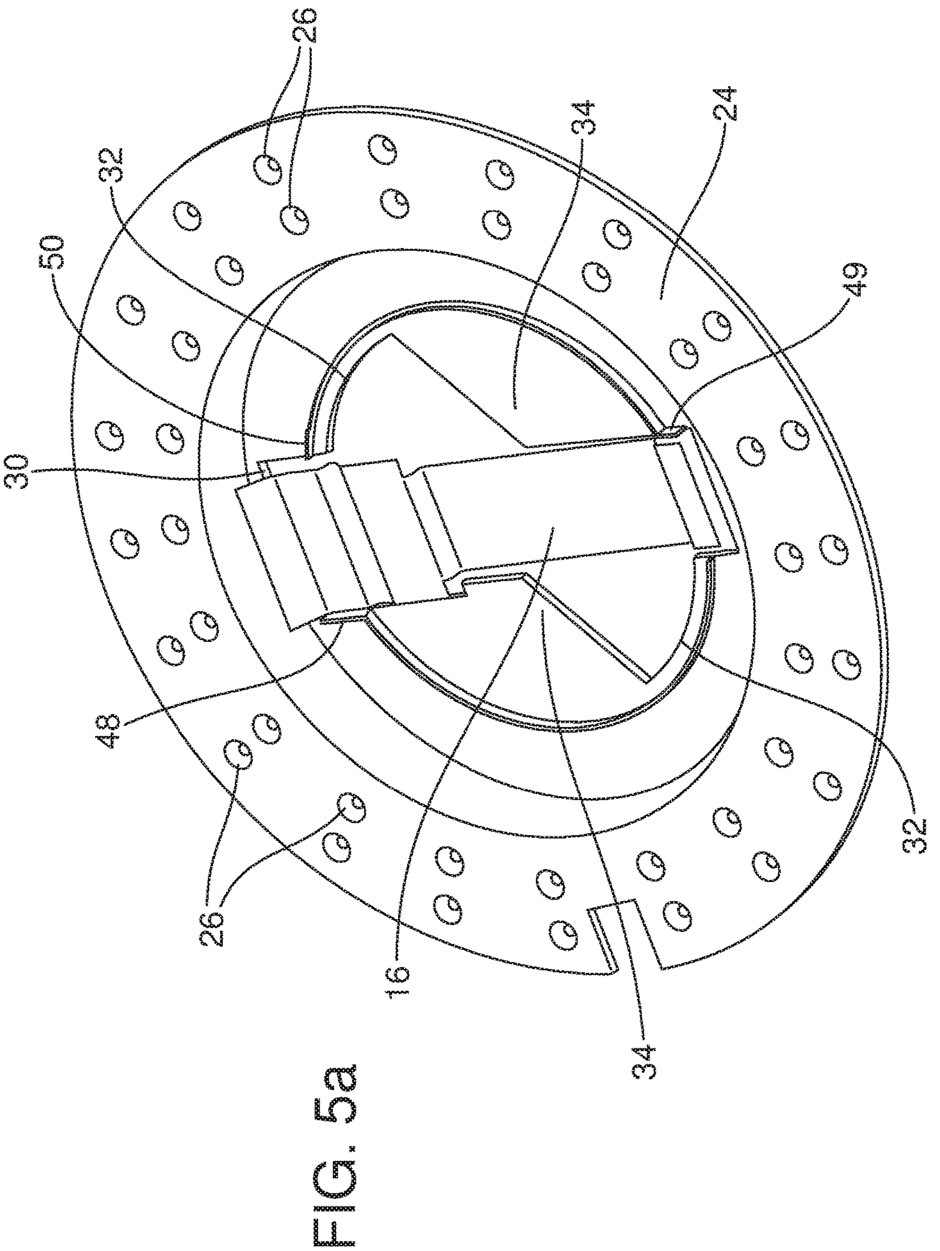

When one wishes to mount the dome light assembly 10 to the headliner H, an appropriate adhesive is applied to the lower face 47 of the flange 24 and, if desired, also around the upper face of the margin of the headliner H surrounding the mounting opening M. The mounting bracket 12 is inserted through the mounting opening M of the headliner H. More specifically, the end of the mounting bracket 12 including the receiver 28 is inserted through the mounting opening M until the flange 24 engages the headliner H and the adhesive sets to secure the mounting bracket 12 in position. Next, the fastener/T-shaped lug 16 on the lamp housing 14 is aligned on the axis A1 and inserted into the insert portion 30 of the receiver 28 until the upper wall 40 of the lamp housing 14 engages the bottom of the receiver. This aligns the margin 34 of the receiver with the mounting slot 46. See FIGS. 2 and 5. Next, the lamp housing 14 is rotated with respect to the mounting bracket 12 until the fastener/T-shaped lug 16 is received in the locking portion 32 and oriented along the second axis A2. As illustrated in FIG. 5*a*, a first stop 48 is provided on the receiver margin 34 adjacent the insert portion 30 to prevent one from turning the lamp housing in the wrong direction. A second stop 49 may also be provided at the opposite point of the insert portion 30 as shown.

As the lamp housing 14 is rotated to displace the fastener/T-shaped lug 16 from the insert portion 30 oriented along axis A1 to the locking portion 32 oriented on axis A2, (see action arrow in FIG. 6), the lug crosses over a locking tab 50 provided on the receiver margin 34. As best illustrated in FIG. 6*a*, that locking tab 50 includes a beveled or cam edge 52 to aid the displacement of the fastener/T-shaped lug 16 into the locking position.

As further illustrated in FIGS. 3*a* and 6*a* a second stop 54 is provided on the receiver margin 34 adjacent the locking portion 32. Here it should be appreciated that the locking tab 50 is provided on the receiver margin 34 between the first stop 48 and the second stop 54 substantially at the interface between the locking portion 32 and the insert portion 30. As best illustrated in FIGS. 2 and 4*c*, when the lamp housing 14 is in the locking position, a portion of the receiver margin 34 is captured in the mounting slot 46 between the upper wall 40 of the lamp housing 14 and the fastener/T-shaped lug. Further, the fastener/T-shaped lug 16 is effectively captured between the locking tab 50 and the second stop 54 to ensure the integrity of the connection between the lamp housing 14 and the mounting bracket 12.

In summary, the dome light assembly 10 provides a number of benefits and advantages. The mounting bracket 12 is designed in a manner to require only one demolding direction so that the tool to make the bracket is less expensive. Secondary molding operations are avoided. The dome lamp assembly 10 is also easy to assemble by simply inserting the fastener 16 on the lamp housing 14 into the insert portion 30 of the receiver 28 and then rotating the lamp housing until the fastener is received in the locking portion 32. The stops 48 and 49 insure that the lamp housing 14 is rotated in the proper direction. The locking tab 50 and stop 54 insure the integrity of the connection. Further, the entire assembly 10 is lightweight so the potential for the headliner H to sag is virtually eliminated.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A dome light assembly for mounting to a headliner in a motor vehicle, comprising:

a mounting bracket including (a) a flange, engaging an upper face of said headliner, and (b) a receiver;

a lamp housing including a fastener secured to said receiver; and a light source held on said lamp housing;

said dome light assembly being characterized by said receiver including an aperture in said mounting bracket, said aperture being irregular in shape and including an insert portion and a locking portion, said insert portion being oriented along a first axis and said locking portion being oriented along a second axis oriented at an angle to said first axis, and said fastener being a T-shaped lug projecting from said lamp housing.

2. The dome light assembly of claim 1, wherein said receiver further includes a margin of said mounting bracket outlining said insert portion and said locking portion of said irregular aperture.

3. The dome light assembly of claim 2, including a first stop on said margin adjacent said insert portion of said irregular aperture.

4. The dome light assembly of claim 3, including a second stop on said margin adjacent said locking portion of said irregular aperture.

5. The dome light assembly of claim 4, including a locking tab on said margin between said first stop and said second stop and between said locking portion and said insert portion.

6. The dome light assembly of claim 5, wherein a mounting slot is provided between said T-shaped lug and said lamp housing.

7. The dome light assembly of claim 6, wherein said lamp housing is displaceable between an installation position wherein said T-shaped lug is received on said insert portion of said aperture and a locked position wherein said T-shaped lug is rotated into said locking portion of said aperture with said margin received in said mounting slot.

8. The dome light assembly of claim 7, wherein said T-shaped lug is captured between said locking tab and said second stop when said lamp housing is in said locked position.

9. The dome light assembly of claim 8, wherein said flange extends in a first plane and said receiver extends in a second plane.

10. The dome light assembly of claim 9, wherein said first plane is parallel to and above said second plane when said dome light assembly is fully assembled and mounted in a mounting opening in said headliner of said motor vehicle.

11. A method of mounting a dome light assembly to a headliner of a motor vehicle, comprising:

inserting a mounting bracket through a mounting opening of said headliner;

engaging an upper surface of said headliner with a flange on said mounting bracket;

inserting a T-shaped lug on a lamp housing into an insert portion of an aperture in said mounting bracket; and rotating said lamp housing with respect to said mounting bracket to lock said lamp housing to said mounting bracket.

12. The method of claim 11, including rotating said lamp housing until said T-shaped lug is received and held in a locking portion of said aperture.

13. The method of claim 12, including capturing a margin of said mounting bracket around said aperture in a mounting slot between said T-shaped lug and said lamp housing.

14. The method of claim 13, including capturing said T-shaped lug in said locking portion of said aperture between a stop and a locking tab.

* * * * *